Figure 1:
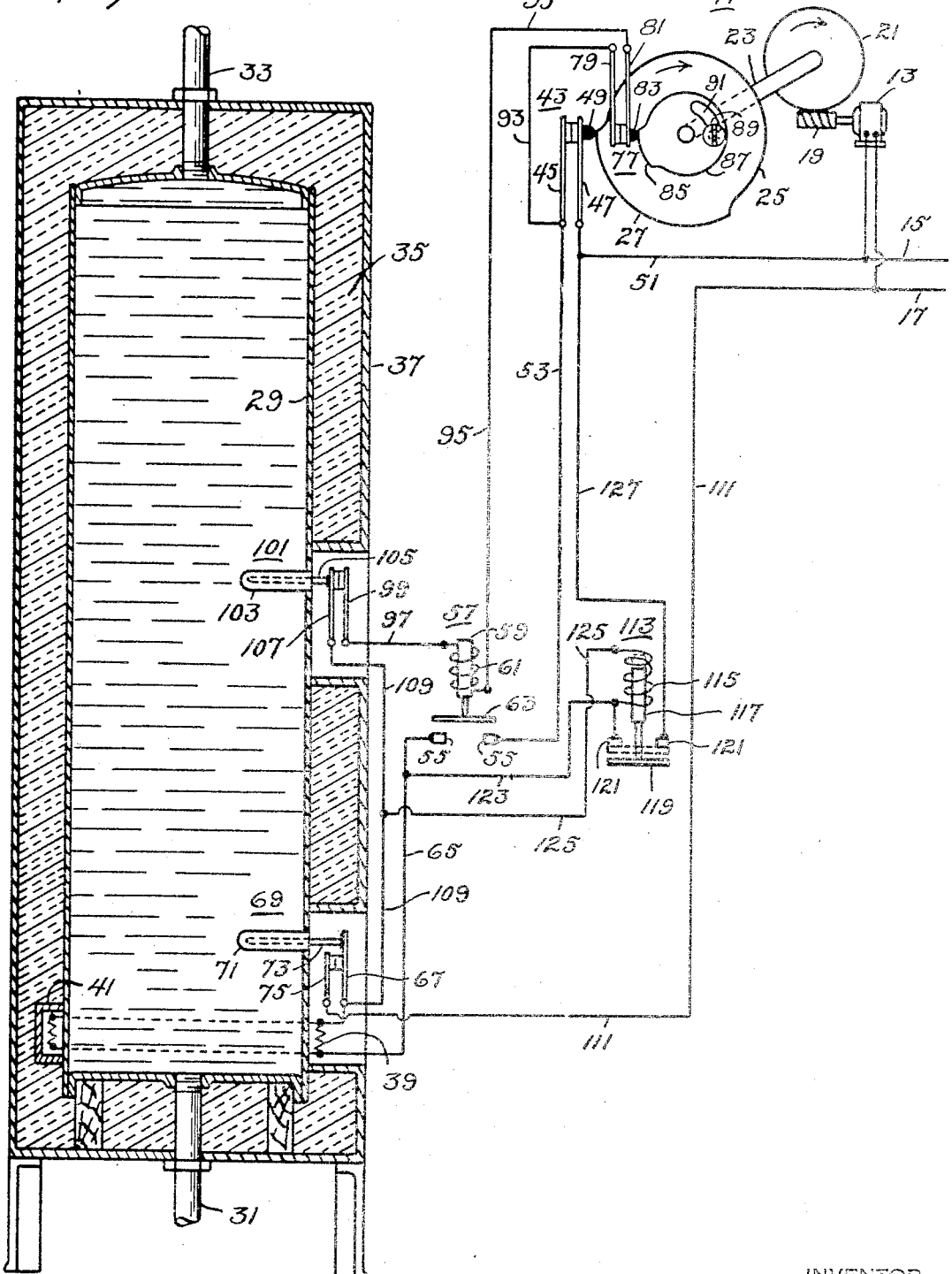

Dec. 16, 1941.  C. M. OSTERHELD  2,266,245
OFF-PEAK WATER HEATING SYSTEM
Filed Oct. 12, 1940   3 Sheets-Sheet 1

INVENTOR
CLARK M. OSTERHELD
BY
ATTORNEY

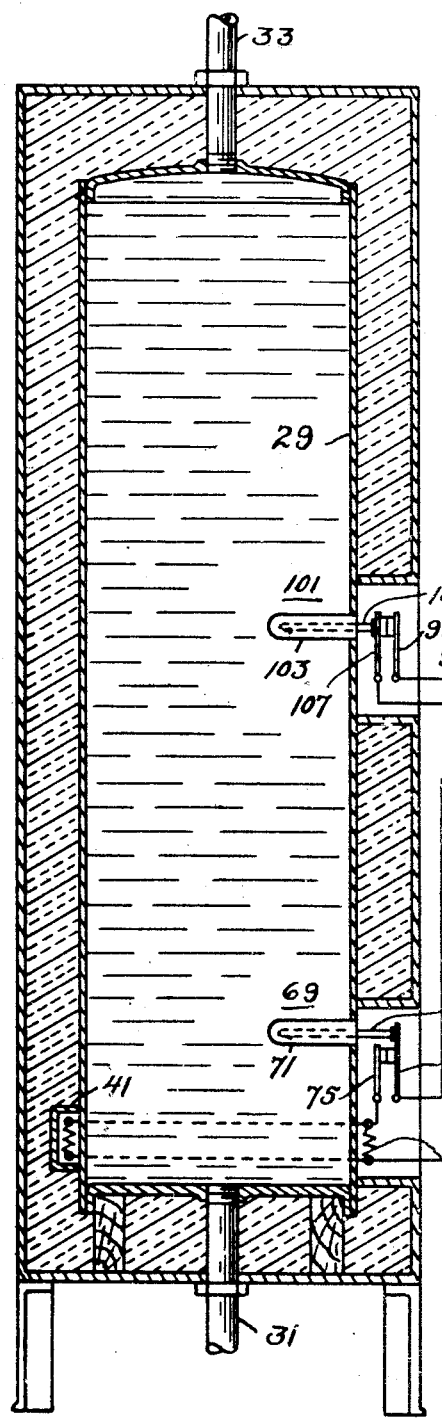

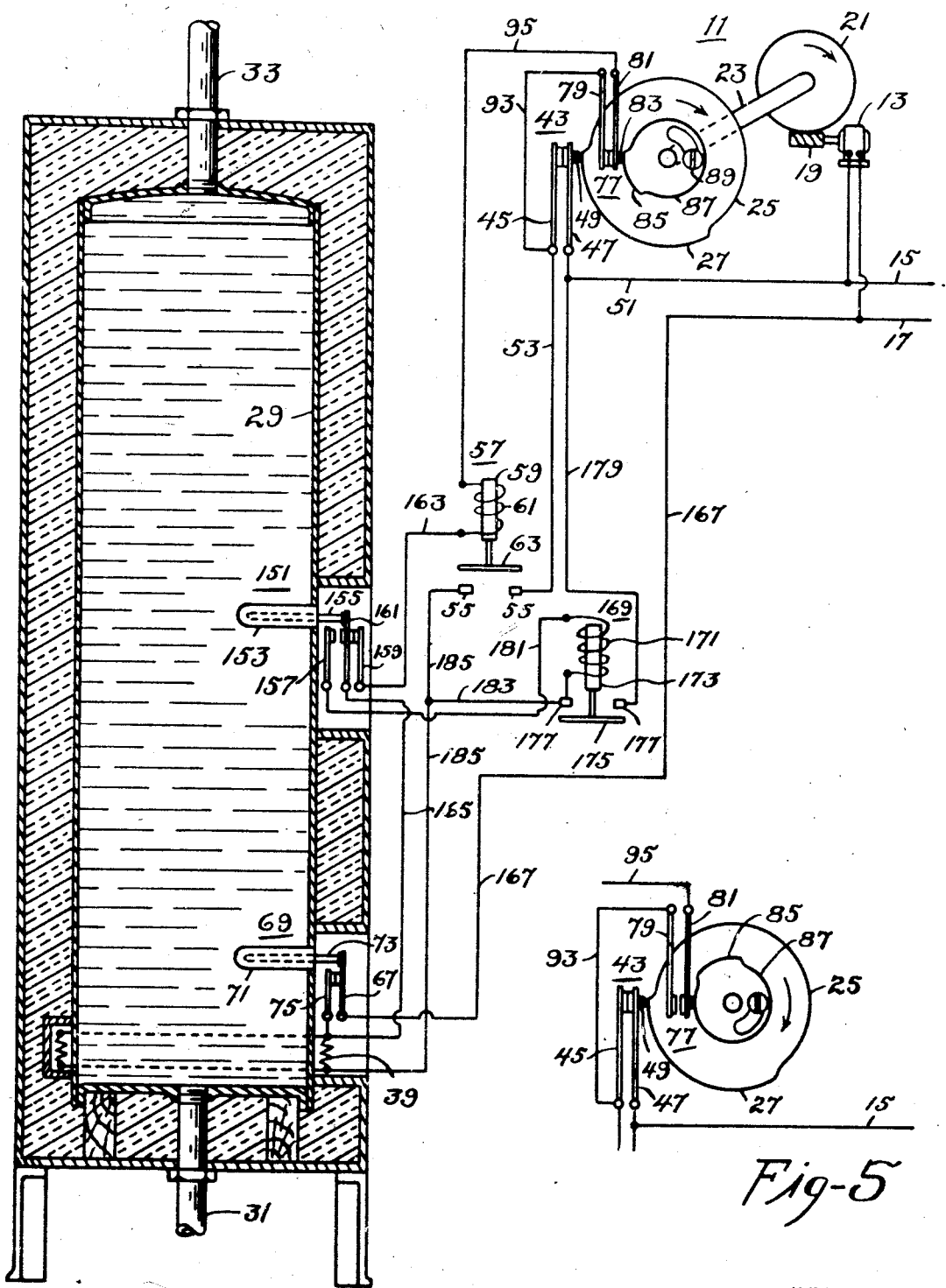

Patented Dec. 16, 1941

2,266,245

UNITED STATES PATENT OFFICE 2,266,245

OFF-PEAK WATER HEATING SYSTEM

Clark M. Osterheld, Stoughton, Wis., assignor to McGraw Electric Company, Elgin, Ill., a corporation of Delaware Application October 12, 1940, Serial No. 360,877

10 Claims. (Cl. 219—39)

My invention relates to water heating systems and more particularly to off-peak water heating systems.

One of the objects of my invention is to provide a relatively simple system which will cause energization of the heater of a hot water tank at the start of an off-peak period under certain conditions and which will delay energization of the heater under certain other conditions, referring more particularly to the quantity of hot water in the tank at the start of an off-peak period.

Another object of my invention is to provide a plurality of means controlled separately and jointly in accordance with time and with the temperature of a predetermined part of the water in a hot water tank to cause energization of the heater at the start of an off-peak period or to delay such energization for a predetermined adjustable part of an off-peak period.

Another object of my invention is to provide a time and temperature controlled means for causing selective energization of the heater of a hot water tank at a time changing in accordance with the amount of cold water in the tank at the start of an off-peak period and for providing thermally controlled means responsive to the temperature of the water in a predetermined part of the tank to cause prolongation of the energization of the heater beyond the end of an off-peak period in accordance with the quantity of cold water in the tank at the end of an off-peak period.

Another object of my invention is to provide an off-peak water heating system in which prolongation of the energization of the heater of a hot water tank is effected when the tank is either not substantially full of hot water at the end of an off-peak period or a predetermined fractional part of the water content of the tank is not hot at the end of an off-peak period.

Another object of my invention is to provide an off-peak water heating system in which energization of the electric heater of a hot water tank is delayed for an adjustably predetermined length of time after the start of an off-peak period under certain conditions connected with the quantity of hot water in the tank at predetermined times, which system will cause de-energization of the electric heater in case all of the water in the tank is hot during the rest of an off-peak period after the delay period and in which reenergization of the heater is effected in case withdrawal of hot water occurs during the rest of the off-peak period, the amount of hot water thus withdrawn being an appreciable quantity.

Other objects of my invention will either be apparent from a description of several forms of systems embodying my invention or will be pointed out hereinafter and particularly set forth in the appended claims.

In the drawings,

Figure 1 is a diagrammatic representation of a water heating system embodying my invention as applied to a domestic hot water tank, the latter being shown in vertical section, Fig. 2 is a view similar to Fig. 1 but showing a slightly different form of system, Fig. 3 is a view, in front elevation, of a part of a timing means and switches controlled thereby constituting a part of my improved water heating system, the parts of the timer being shown in a somewhat different position than that in which they are shown in Fig. 2 of the drawings, Fig. 4 is a view of a still further modification of off-peak water heating system embodying my invention, and, Fig. 5 is a view similar to Fig. 3 showing certain parts of my system in a different position than that in which they are shown in Fig. 4 of the drawings.

Referring first of all to Fig. 1 of the drawings, I have there illustrated a continuously operative timing means 11 including, for purposes of illustration, a synchronous electric motor 13 connected to supply circuit conductors 15 and 17 so that the motor will operate during all of the time that energy is supplied to the conductors 15 and 17. A worm gear 19 is mounted on the motor shaft and engages a worm wheel 21 which latter is mounted on a shaft 23. A cam disc 25 is also mounted on shaft 23 and the greater part of the periphery of disc 25 has a certain outer radius while a portion 27, namely the off-peak portion, has a greater outer radius. It will be noted that the peripheral extent of the portion 27 of greater radius, is substantially one-third of the total periphery of cam disc 25 which latter is rotated through one complete turn in a day of twenty-four hours. The time-extent of portion 27 is therefore substantially eight hours which, for purposes of illustration, has been assumed to be the length of an off-peak period desired by the central station of the utility supplying current to the conductors 15 and 17. It may further be assumed for illustrative purposes, that the position of cam disc 25 is that which will be occupied by it at 10:00 p. m. so that the off-peak period of eight hours will end at approximately 6 a. m. It is to be understood, however, that, within the scope of my invention, I may make the peripheral extent of portion 27 more or less than that shown in Fig. 1 of the drawings and that disc 25 may be positioned on shaft 23 at some other position relatively to the shaft so that it is possible to vary not only the duration of an off-peak period but also the starting and the ending time thereof. I desire to point out also that while I have shown a specific embodiment, in a simple form of a continuously operative timer, I do not desire to be limited thereto but I may use any other timer effective for the same general purpose since the continuously operative timing means constitutes no fundamental part of my invention.

The water heating system to be presently described in detail is adapted to be operatively associated with a hot water tank and for illustrative purposes I have shown the usual kind of circular elongated hot water tank 29 used for domestic purposes. A cold water inlet pipe 31 is provided at the bottom of the tank and a hot water outlet pipe 33 is provided at the top of the tank which latter may be surrounded by a mass 35 of suitable heat insulating material which is held in proper operative position by an outer casing 37, all in a manner now well known in the art.

I provide an electric heating element 39 which, again for illustrative purposes, I have indicated as extending peripherally around the tank 29 and located in a tunnel 41. Reference may here be made to my copending application Ser. No. 284,881 filed July 17, 1939, in which I have disclosed and claimed an electric heater which I may use with the present water heating system.

To control the energization of heater 39 I provide a main timer controlled switch 43 which includes a relatively rigid contact arm 45 and a resilient contact arm 47 which latter is normally biased out of engagement with contact arm 45 but is adapted to be moved into engagement therewith by the cam portion 27 engaging a lug 49 mounted on the arm 47. Supply circuit conductor 15 is connected to contact arm 47 by a conductor 51 and contact arm 45 is connected through a conductor 53 with one of a pair of fixed contact members 55 of an electromagnet switch or contactor 57 which includes in addition to the fixed contact members 55, a magnetizable core member 59, a coil 61 and a contact bridging member 63. It is to be noted that when coil 61 is traversed by an electric current, core member 59 will be energized and moved to substantially the position shown in Fig. 1 of the drawings, whereby contact bridging member 63 will be out of engagement with contact members 55, but that when coil 61 is deenergized, contact bridging member 63 will drop downwardly into engagement with fixed contact members 55, all in a manner now well known in the art relating to electromagnetic contactors.

The other fixed contact member 55 is connected through a conductor 65 to one terminal of heater 39, the other terminal of which is connected to a resilient contact arm 67 of a main thermally actuable heater control switch 69 which includes, in addition to the resilient contact arm 67, a tubular member 71 suitably secured to the wall of tank 29 to extend through the wall into the tank to be engaged by the water in the tank at a lower portion thereof. The switch includes also an expansion rod 73 engageable with resilient contact arm 67 to cause it to move out of engagement with a relatively rigid contact arm 75, this disengagement occurring when the water surrounding tubular member 71 has been heated to a certain relatively high temperature, generally denominated by the term "Hot." I desire it to be understood that any other form of thermally actuable switch effective for the same purpose may be used by me and I have shown a simple form of thermally actuable switch in order to illustrate the desired method of operation of that part of my system.

I provide an auxiliary timer actuated switch 77 which includes an outer relatively rigid contact arm 79, an inner resilient contact arm 81 which has a lug 83 of electric insulating material thereon which lug is adapted to be engaged by a portion 85 of a cam disc 87, the portion 85 having a larger outer radius than the rest of the cam disc 87. The cam disc 87 is adjustably mounted on shaft 23 and may be mounted thereon adjacent to cam disc 25 to permit of using a stud or screw 89 extending through an elongated arcuate slot 91 in disc 87 to fix the position of cam disc 87, and particularly of the portion 85 thereof, relatively to the position of the portion 27 of cam disc 25. It will be noted that auxiliary switch 77 is in closed position at substantially the same time that switch 43 has been moved into closed position, that is, at 10:00 p. m.

Contact arm 45 is connected through a conductor 93 with contact arm 79 and contact arm 81 is connected through a conductor 95 with one terminal of coil 61, the other terminal of which is connected through a conductor 97 with a relatively rigid contact arm 99 of an auxiliary or upper thermally actuable switch 101. This switch 101 includes also a tubular member 103 similar to tubular member 71, an expansion rod 105 and a resilient contact arm 107 normally biased out of engagement with contact arm 99 but adapted to be moved into engagement therewith by expansion rod 105 when tubular member 103 is surrounded by hot water. Contact arm 107 is connected through a conductor 109 with contact arm 67 of the main thermally actuable switch 69. Contact arm 75 of main thermal switch 69 is connected through a conductor 111 with the other supply circuit conductor 17.

The main timer controlled switch 43, the auxiliary timer controlled switch 77, the electromagnetic contactor 57, the auxiliary thermal switch 101 and the main thermal switch 69 cooperate, under certain operating conditions to be hereinafter more clearly set forth, to determine the time of energization of the heater 39 during an off-peak period, such energization being adapted to be effected at either the start of an off-peak period or after an adjustably predetermined delay.

I provide further thermally-controlled means for causing prolongation of the energization of the heater 39 under certain operating conditions, this means including a second electromagnetic contactor 113 including a coil 115, a magnetizable armature core 117, a contact bridging member 119 connected with the core and adapted to engage with and be disengaged from a pair of fixed contact members 121. One terminal of coil 115 is electrically connected to one of the contact members 121 and also, through a conductor 123, with conductor 65. The other terminal of coil 115 is connected through a conductor 125 with conductor 109.

It is, of course evident that should the tank 29 be completely filled with hot water at the start of the off-peak period, the main thermal switch 69 would be in open position and no energization of the heater 39 would occur since its energizing circuit would have been interrupted by disengagement of contact arms 67 and 75. Let it be assumed, however, that the tank contains an appreciable amount of cold water which, in tanks of this general type, will be located in the lower part of the tank and since I prefer to locate the main thermal switch 69 in such a position that it will be moved to open position only when the tank is substantially full of hot water, this switch will be closed.

If it be further assumed that the tank is at least one-half full of hot water so that auxiliary thermal switch 101 is in closed position, no energization of heater 39 can be effected since coil 61 of the first named electromagnetic contactor, which may be designated as the delay contactor, will be energized through a circuit extending substantially as follows: From supply circuit conductor 15 through conductor 51, contact arms 47 and 45 which are in engagement at this time, through conductor 93, through engaged contact arms 79 and 81 which are also in engagement with each other at this time, through conductor 95, coil 61, conductor 97, through contact arms 99 and 107 which are in engagement with each other, through conductor 109, through contact arms 67 and 75 which are in engagement with each other and through conductor 111 to the other supply circuit conductor 17. This holds contact bridging member 63 out of engagement with fixed contact members 55 and it is thus evident that, under these assumed operating conditions, more particularly that while there is an appreciable quantity of cold water in the tank, substantially more than half of its water content is hot.

Let it be assumed that a slightly different condition exists as to the quantity of hot water in the tank, namely that the tank is less than one-half full of hot water so that tubular member 103 is surrounded by cold water, that is, the tank is appreciably less than one-half full of hot water. In this case the hereinbefore described energizing circuit through coil 61 of the delay contactor will not be provided upon closure of timer controlled switches 43 and 77, it being evident, of course, that if the upper thermal switch 101 is subject to cold water. the lower main thermal switch 69 will also be subject to cold water.

The delay period is shown approximately or substantially, in Fig. 1 of the drawings, as extending for about two hours and at the end of that time the contact arm 81 will be permitted to move out of engagement with contact arm 79 when lug 83 on arm 81 moves off the portion 85 of disc 87, it being understood that discs 21, 25 and 87 are rotated continuously in a clockwise direction as indicated by the arrow on disc 25. In case the hereinbefore described energizing circuit through coil 61 of the delay contactor was energized, as hereinbefore described, this energization will be interrupted when timer-controlled switch 77 is moved into open position at the end of a delay period with resultant downward movement of core 59 and contact bridging member 63, the latter then engaging the fixed contact members 55. This closes an energizing circuit through heater 39 substantially as follows: From supply circuit conductor 15, through conductor 51, contact arms 45 and 47, conductor 53, cooperating engaged contact members 55 and 63, conductor 65, heater 39, engaged contact arms 67 and 75 and through conductor 111 to the other supply circuit conductor 17.

At the time of closure of the energizing circuit for the heater through main timer controlled switch 43 and through the contact members of delay contactor 57, it being noted that all of these switches are in series circuit relation relatively to each other and to the main thermal switch 69, an energizing circuit through coil 115 of prolongation contactor 113 is closed, extending substantially as follows: From supply circuit conductor 15 through conductor 51, engaged contact arms 47 and 45, conductor 53, engaged contact members 55 and 63, conductor 123, coil 115, conductor 125, conductor 109, through contact arms 67 and 75 and then through conductor 111 to the other supply circuit conductor 17. It was hereinbefore stated that one of the fixed contact members 121 was connected to conductor 65 by conductor 123 and it will be noted that this connects one of the fixed contact members 121 to one of the fixed contact members 55 of the delay contactor 57. The other fixed contact member 121 is connected by a conductor 127 with conductor 51. Upon energization of the coil 115 of the prolongation contactor 113, core member 117 and contact bridging member 119 are moved upwardly, whereby the series connected switches 43 and 57 are shunted by the cooperating contact members of contactor 113, this shunt circuit being traced generally as extending through conductor 127, the cooperating contact members 119 and 121 and conductor 123. It is to be assumed that the tank is more than one-half full of hot water toward the end of an off-peak period and while it may happen that the tank is completely filled with hot water before the end of the off-peak period, it is assumed for purposes of describing the operation of the prolongation contact 113, that the tank still contains as appreciable amount of cold water at the end of the off-peak period. In this case the contactor 113 will remain in the position shown by broken lines in Fig. 1 of the drawings, a holding circuit for the coil 115 being provided extending substantially as follows: From supply circuit conductor 15 through conductors 51 and 127, through the engaged contact members 121 and 119, through coil 115, through conductors 125 and 109, through the contact arms 67 and 75 and from there through conductor 111 to the other supply circuit conductor 17 and it may be pointed out that this holding circuit is independent of the main timer controlled switch 43 so that energization of this holding circuit will continue after or beyond the end of an off-peak period whereby an energizing circuit for the heater 39 is provided, extending substantially as follows: From supply circuit conductor 15 through conductors 51 and 127, through engaged contact members 121 and 119, through conductor 123 and 65, through heater 39, through the engaged contact arms 67 and 75 and then through conductor 111 to the other supply circuit conductor 17.

The amount of cold water in the tank necessary to cause this action is, of course, variable and may be only sufficient to cause the main thermal switch 69 to be closed or the cold water may extend well thereabove to the auxiliary thermal switch 101. It is thus evident that the amount of overrun or prolongation of the energization of the heater 39 will be variable depending upon the presence of at least an appreciable amount of cold water in the tank and increasing generally with the amount of cold water in the tank at the end of an off-peak period. It is, of course, possible also that withdrawal of hot water from the tank may occur after the end of an off-peak period and before all of the water in the tank is hot, this, of course, extending the prolongation of the energization of the heater since main thermal switch 69 will cooperate with the second contactor to continue the energization of the heater until all of the water in the tank is hot.

Referring now to Fig. 2 of the drawings, I have there shown a water heating system substantially similar in layout and connection and in operation to that shown in Fig. 1 of the drawings, the main difference between these two systems being that whereas the coil 115 of the prolongation contactor 113 is a shunt coil, the coil of the prolongation contactor provided in the system of Fig. 2 is a series coil. I have, therefore, applied the numerals of Fig. 1 of the drawings wherever they can properly be applied to corresponding elements in Fig. 2 of the drawings either identical or operating in the same manner as in Fig. 1 of the drawings.

I provide a lower main thermally actuable switch 69 and an upper auxiliary thermally actuable switch 101 in this system and I provide a prolongation electromagnetic contactor 129 comprising in addition to a coil 131 which is adapted to carry a relatively heavy current, a magnetizable armature core 133 having connected therewith a contact bridging member 135 which is adapted to engage with and be disengaged from a pair of fixed contact members 137. Contact arm 47 and conductor 51 are connected to one of the fixed contact members 137 through a conductor 139, while the other fixed contact member 137 is connected to one terminal of coil 131 and to contact arm 45 by a conductor 141. The other terminal of coil 131 is connected to one of the fixed contact members 55 of contactor 57 through a conductor 143.

Contact arm 107 of the auxiliary upper thermal switch 101 is connected through a conductor 145 with one terminal of the heater 39, the other terminal of which is connected to contact arm 75. Contact arm 67 of thermal switch 69 is connected through a conductor 147 with the other fixed contact member 55. A conductor 149 connects supply circuit conductor 17 with conductor 145.

It will be evident that when the main timer controlled switch 43 is closed at the start of an off-peak period and that if at the same time, the auxiliary timer controlled switch 77 is also closed and if, further, the amount of cold water in the tank is sufficient to immerse tubular member 103 with consequent opening of the switch 101, an energizing circuit through the heater will be effected substantially as follows: From supply circuit conductor 15 through conductor 51, contact arms 47 and 45, conductor 141, coil 131, conductor 143, cooperating engaged contact members 55 and 63, conductor 147, engaged contact arms 67 and 75, through heater 39 and through conductors 145 and 149 to the other supply circuit conductor 17. This is made possible, of course, because of the fact that even though the contact arms of auxiliary switch 77 are in engagement, the contact arms 99 and 107 of the auxiliary thermal switch 101 are out of engagement with each other whereby energization of the heater 39 is effected at the start of the off-peak period.

The flow of current, as hereinbefore described, through coil 131 of the prolongation contactor 129 causes energization of the armature core 133 with resultant upward movement thereof and attendant upward movement of contact bridging member 135 into engagement with the fixed contact members 137, but this will have no immediate effect upon the flow of current through heater 39. It will, of course, provide a shunt circuit relative to the main timer controlled switch 43 substantially as follows: From supply circuit conductor 15 through conductors 51 and 139, engaged contact members 137 and 135, coil 131, through conductor 143, through engaged contact members 55 and 63, through conductor 147, through engaged contact arms 67 and 75 and through heater 39 and from there through conductors 145 and 149 to the other supply circuit conductor 17. This latter energizing circuit will, as is evident, permit opening of the main timer-controlled switch 43 at the end of an off-peak period without interruption of the energization of the heater 39 in case there is still an appreciable amount of cold water in the bottom of the tank with resultant maintenance of the engagement of contact arms 67 and 75 which, as was hereinbefore stated, will remain in engagement with each other until substantially all of the water in the tank is hot. In other words, if all of the water in the tank is not hot at the end of an off-peak period, the main thermal switch 69 will act as a thermal prolongation means controlling the prolongation contactor 129 to continue energization of the heater until all of the water in the tank is hot.

It may further be here pointed out that should it occur that all of the water in the tank has been heated to a given temperature, generally described by the word "Hot," before the end of an off-peak period with resultant deenergization of the heater, and should withdrawal of hot water occur before the end of an off-peak period, sufficient to cause immersion of the main thermal switch 69 in cold water, the heater 39 will be reenergized and its energization would be prolonged beyond the end of an off-peak period and until substantially all of the water in the tank is hot. It is evident also that should additional withdrawals of hot water occur after the end of the off-peak period but before deenergization of the system by the main thermal switch 69, continuance of the energization of the heater 39 would be ensured, such energization continuing until substantially all of the water in the tank is hot.

Referring now to Fig. 3 of the drawings, I have there shown how it is possible in my improved water heating system to ensure start of the energization of the heater at the start of an off-peak period by merely manually shifting the position of the auxiliary cam disc 87 relatively to the main cam disc 25 in such a manner that the auxiliary timer-controlled switch 77 will be open before the main timer switch 43 has been closed, as hereinbefore set forth. This means that it is possible for the user of a system of the kind herein described and disclosed to ensure energization of the heater beginning at the start of an off-peak period irrespective of the amount of hot water in the tank at the start of an off-peak period.

Referring now to Figs. 4 and 5 of the drawings, I have there illustrated a further modification of, more particularly, the system shown in Fig. 1 of the drawings, whereby energization of the heater 39 is delayed in case a predetermined fractional part of the water in the tank is hot and in which case prolongation of the energization of the coil 39 is ensured in case the tank is not at least half full of hot water at the end of an off-peak period.

I provide the same continuously operative timing means as was shown in Fig. 1 of the drawings, the same delay electromagnetic switch or contactor and the same main thermal switch preferably located at or near the bottom of the tank. I provide a modified form of auxiliary thermal switch 151 comprising a tubular member 153 suitably secured to the tank 29 to close an opening in the wall of the tank in a fluid-tight manner, an expansion rod 155 in the tubular member 153, a relatively rigid inner contact arm 157, a relatively rigid outer contact arm 159 and a resilient contact arm 161 normally yieldingly biased into engagement with the inner contact arm 157 but adapted to be moved out of engagement therewith and into engagement with the outer contact arm 159 by the expansion rod 155 if it and the tubular member 153 are surrounded by or responsive to hot water.

One end of the coil 61 of the delay contactor 57 is connected to contact arm 81 of the auxiliary timer controlled switch 77 by conductor 95 while the other end of coil 61 is connected by a conductor 163 with contact arm 159. Contact arm 161 is connected by a conductor 165 to contact arm 75 of the main thermal switch 69, which arm is also connected to one terminal of the heater 39. Contact arm 67 is connected through a conductor 167 to the other supply circuit conductor 17.

I provide a prolongation contactor 169 comprising, in addition to a coil 171, a magnetizable core member 173 having connected therewith a contact bridging member 175 which is adapted to be engaged with and disengaged from substantially fixed contact members 177, all in a manner well known in the art. Contact arm 47 is connected through a conductor 179 with one of the fixed contact members 177. The other fixed contact member 177 is connected to one terminal of coil 171, while the other terminal of coil 171 is connected through a conductor 181 with contact arm 157. The other fixed contact member 177 is connected through a conductor 183 with a conductor 185 which connects one of the fixed contact members 55 with one terminal of heater 39.

Let it be assumed that the continuously operative timer 11 and the parts thereof are in the positions shown in Fig. 4 of the drawings, which, for convenience, may be assumed to be at 10:00 p. m. Let it be further assumed that the amount of hot water in the tank 29 is sufficient to immerse tubular member 153, that is, the tank is more than half full of hot water. Under this condition contact arm 161 will be in the position shown in Fig. 4 and a circuit through coil 61 will be established as follows: From supply circuit conductor 15 through conductor 51, engaged arms 47 and 45, through conductor 93 and through engaged contact arms 79 and 81, conductor 95, coil 61, conductor 163, through engaged contact arms 159 and 161, through conductor 165, through engaged contact arms 75 and 67 and through conductor 167 to the other supply circuit conductor 17. Contact bridging member 63 will therefore be held in its raised position where it is out of engagement with the fixed contact members 55 and the hereinbefore traced energizing circuit through heater 39 including more particularly the main timer controlled switch 43, the cooperating contact members 55 and 63 of the delay contractor 57, and the main thermal switch 69 will not be provided.

At the end of a predetermined adjustable time, controlled more particularly by the auxiliary timer-controlled switch 77, this switch will be opened by reason of the fact that the portion 85 of the disc 87 will be turned out of engagement with lug 83 with resultant opening of the above described energizing circuit of coil 61 and energization of the heater 39 will then begin.

It is, of course, to be understood that in case the tank contained such an amount of cold water at the start of an off-peak period that tubular member 153 was immersed therein, contact arm 161 would then be in engagement with contact arm 157, the above described energizing circuit for coil 61 would not have been established and energization of the heater 39 would have been effected at the start of the off-peak period.

In case the amount of hot water in the tank at or just before the end of an off-peak period is not sufficient, for any reason whatever, to immerse the tubular member 153, the resilient contact arm 161 would then be in engagement with contact arm 157 and an energizing circuit through the coil 171 would be established as follows: From supply circuit conductor 15 through conductor 51, through engaged contact arms 47 and 45, through conductor 53 and through engaged contact members 55 and 63, through a part of conductor 185 and through conductor 183 to a contact member 177, through coil 171, through conductor 181 and through engaged contact arms 157 and 161, through conductor 165, through engaged contact arms 75 and 67 and from there to the other supply circuit 17. This would cause energization of core member 173 with attendant upward movement thereof whereby contact bridging member 175 is moved into engagement with fixed contact members 177 whereby an energizing circuit through heater 39 is established as follows: From supply circuit conductor 15 through conductors 51 and 179, through engaged contact members 175 and 177, through conductors 183 and 185 into the heater 39, from there through engaged contact arms 75 and 67 and through conductor 167 to the other supply circuit conductor 17. This circuit is not dependent upon the switch 43 which may, therefore, open at the end of an off-peak period without affecting continuation of the energization of the heater 39 because of the fact that a holding circuit through coil 171 of the prolongation contactor 169 was established as follows: From supply circuit conductor 15 through conductors 51 and 179, through engaged contact members 177 and 175 through coil 171 through conductor 181 to contact arm 157 in engagement with contact arm 161, from there through conductor 165 and through engaged contact arms 75 and 67 to conductor 167 and from there to the other supply circuit conductor 17.

Should, therefore, the tank be less than half full of hot water at the end of the off-peak period as might happen in case of withdrawals of hot water during the off-peak period, prolongation of the energization of the heater 39 would be ensured and it is only necessary, to ensure deenergization of the heater 39, that the amount of hot water in the tank be increased by the action of the heater 39 to an amount that will surround the tubular member 153 with resultant expansion of the rod 155 and interruption of the above described holding circuit of coil 171. This causes deenergization of the heater 39 and this heater will not be reenergized until the start of the next succeeding off-peak period when energization of the heater will be effected at the start of an off-peak period if the tank is less than half full of hot water.

Reference to Fig. 5 of the drawings will show the position which may be occupied by the auxiliary disc 87 relatively to the main cam disc 25 in order to ensure that the heater 39 will be energized at the start of an off-peak period irrespective of the amount of hot water in the tank at that time.

While I have illustrated and described specific embodiments of thermally actuable switches responsive to tank water temperature, I do not desire to be limited to these particular constructions since they have been shown mainly for illustrative purposes and any thermally actuable switches operable in the same manner may be used by me.

I wish to point out further that while I have shown a specific position of the thermally actuable switches 101 and 151 as being substantially midway of the tank, my invention is not to be considered as being limited thereto even though I may use the term "half-full of hot water" in the specification and in the claims. Expressed broadly, the amount of hot water in the tank may be expressed as being a predetermined fractional part of the water content of a tank, which is to be understood as including all quantities less than the entire tank contents. I may move the auxiliary thermally actuable switch farther up in the tank or lower down in the tank as may be desired by a user and any generally similar position of the auxiliary thermally actuable switch is to be considered as being included in the scope of my invention. Various other modifications of my invention coming within the scope of the appended claims are to be considered as being covered thereby.

I claim as my invention:

1. An off-peak water heating system for a hot water tank having an electric heater, comprising a continuously operative timer, a main heater control switch adapted to energize said system and to be held in closed position by said timer during an off-peak period, a first electromagnetic heater control switch controlled by the joint action of time and tank water temperature controlled means to cause energization of the heater at the start of the off-peak period in case less than a predetermined fractional part of the water content of a tank is hot at the start of an off-peak period, to delay energization of the heater for an adjustably predetermined length of time after start of an off-peak period in case said predetermined fractional part of the water content is hot at the start of an off-peak period and a second electromagnetic heater control switch controlled jointly by time and tank water temperature controlled means to prolong energization of the heater beyond the end of the off-peak period in case the tank contains less than a predetermined amount of hot water at the end of an off-peak period.

2. An off-peak water heating system for a hot water tank having an electric heater, comprising a continuously operative timer, a main heater control switch adapted to be held in closed position by said timer during an off-peak period, a first electromagnetic heater control switch electrically connected in series circuit relation to said main heater control switch, means including switches controlled separately by said timer and by tank water temperature for controlling said first electromagnetic switch to selectively cause energization of the heater on closure of said main heater control switch by the timer at the start of an off-peak period in case the tank is less than approximately half full of hot water at that time, to cause an adjustably predetermined delay in the energization of the heater in case the tank is more than approximately half full of hot water at the start of an off-peak period, a second electromagnetic heater control switch electrically connected in shunt circuit relation to said main heater control switch and controlled by said means controlling said first electromagnetic switch to selectively cause deenergization of the heater during the rest of an off-peak period when a predetermined part of the water in the tank is hot, to cause prolongation of the energization of the heater beyond the end of an off-peak period in case less than said predetermined part of the water in the tank is hot and to then cause deenergization of the heater when said predetermined part of the water in the tank is hot.

3. An off-peak water heating system for a hot water tank having an electric heater, comprising a continuously operative timer, a main heater control switch adapted to be moved to heater energizing position by said timer at the start of an off-peak period and to be held in such position during an off-peak period, means including time and tank water temperature controlled switching means jointly cooperative with said main heater control switch to selectively cause energization of the heater at the start of an off-peak period and to delay such energization of the heater for an adjustably predetermined time after start of an off-peak period in accordance with the predominance of cold or hot water in the tank at the start of an off-peak period and means including a second tank water temperature controlled switching means to cause prolongation of the energization of the heating means beyond the end of an off-peak period in case the tank contains less than a predetermined quantity of hot water at the end of an off-peak period, said energization being interrupted when the tank contains said predetermined quantity of hot water.

4. An off-peak water heating system for a hot water tank having an electric heater, comprising a continuously operative timer, a main heater control switch adapted to be moved into heater energizing position by the timer at the start of an off-peak period and to be held in such position during an off-peak period, a thermally actuable heater control switch electrically connected in series circuit relation to said main heater control switch and adapted to be moved to heater-deenergizing position when substantially all of the water in the tank is hot, a first time and tank water temperature controlled electromagnetic switch electrically connected in series circuit relation to the main and the thermally actuable heater control switches and selectively effective to cause energization of the heater on closure of the main heater control switch in case the tank is less than approximately half full of hot water at the start of an off-peak period and to delay energization of the heater for an adjustably predetermined length of time in case more than a predetermined fractional part of the water content of a tank is hot at the start of an off-peak period and a second tank-water-temperature-controlled electromagnetic switch connected in shunt circuit relation to said main heater control switch and said first named electromagnetic switch and effective to cause continuation of the energization of said heater beyond the end of an off-peak period in case the tank contains less than a predetermined quantity of hot water at the end of the off-peak period and to cause deenergization of the heater when the tank contains at least said predetermined quantity of hot water.

5. An off-peak water heating system for a hot water tank having an electric heater, comprising a continuously operative timer, a main heater control switch adapted to be moved into heater energizing position by the timer at the start of an off-peak period and to be held in such position during an off-peak period, a thermally actuable heater control switch electrically connected in series circuit relation to said main heater control switch and adapted to be moved to heater-deenergizing position when substantially all of the water in the tank is hot, a first time and tank water temperature controlled electromagnetic switch electrically connected in series circuit relation to the main and the thermally actuable heater control switches and selectively effective to cause energization of the heater on closure of the main heater control switch in case less than a predetermined fractional part of the water content of the tank is hot at the start of an off-peak period and to delay energization of the heater for an adjustably predetermined length of time in case more than said predetermined fractional part of the water content of the tank is hot at the start of an off-peak period and a second electromagnetic switch connected in shunt circuit relation to said main heater control switch and said first named electromagnetic switch and controlled by said thermally actuable heater control switch to cause continuation of the energization of the heater beyond the end of an off-peak period until substantially all of the water in the tank is hot.

6. An off-peak water heating system for a hot water tank having an electric heater, comprising a continuously operative timer, a main heater control switch adapted to be moved into heater energizing position by the timer at the start of an off-peak period and to be held in such position during an off-peak period, a thermally-actuable heater control switch electrically connected in series circuit relation to said main heater control switch and adapted to be moved to heater de-energizing position when substantially all of the water in the tank is hot, a first time and tank water temperature controlled electromagnetic switch electrically connected in series circuit relation to the main and the thermally actuable heater control switches and selectively effective to cause energization of the heater on closure of the main heater control switch in case the tank is less than approximately half full of hot water at the start of an off-peak period and to delay energization of the heater for an adjustably predetermined length of time in case the tank is more than approximately half full of hot water at the start of an off-peak period and a second tank water temperature controlled electromagnetic switch connected in shunt circuit relation to said main heater control switch and said first named electromagnetic switch and effective to cause continuation of the energization of said heater beyond the end of an off-peak period in case less than approximately half of the water in the tank is hot at the end of an off-peak period until substantially half of the water in the tank is hot.

7. An off-peak water heating system for a hot water tank having an electric heater, comprising a continuously operative timer, a plurality of electrically connected heater control switches and timer and tank water temperature responsive means controlling said heater control switches to effect energization of the heater at the start of an off-peak period in case the tank is less than half full of hot water at the start of an off-peak period, to effect energization of the heater at an adjustably predetermined later time during the off-peak period in case the tank is substantially half full of hot water at the start of an off-peak period to cause deenergization of the heater when the tank is substantially full of hot water, to cause continuation of the energization of the heater beyond the end of an off-peak period in case the tank is substantially less than half full of hot water at the end of an off-peak period until the tank is substantially half full of hot water.

8. An off-peak water heating system for a hot water tank comprising an electric heater, a continuously operative timing means and a plurality of electrically connected switching means controlled separately and jointly by the timing means and by the temperature of predetermined parts of the water in the tank for causing energization of the heater at the start of an off-peak period in case the tank contains more than a predetermined quantity of cold water at the start of an off-peak period, for causing a delay of adjustably predetermined length of time in the energization of the heater after the start of an off-peak period in case the tank contains less than said predetermined quantity of cold water at the start of an off-peak period, for causing energization of the heater during said delay time in case withdrawal of hot water from the tank causes the presence of more than said predetermined quantity of cold water into the tank, for causing deenergization of the heater during the off-peak period when substantially all of the water in the tank is hot and for causing continuation of the energization of the heater beyond the end of the off-peak period in case the tank contains more than said predetermined quantity of cold water at the end of the off-peak period.

9. An off-peak water heating system for a hot water tank comprising an electric heater, a continuously operative timing means, a heater control switch moved by said timing means into and held in closed position thereby during an off-peak period, a thermally actuable heater control switch responsive to the temperature of the water in the lower part of the tank, an electromagnetic heater control switch electrically connected in series circuit with said first and second heater control switches, a second electromagnetic heater control switch electrically connected in shunt circuit with said first named heater control switch and electric connection between all of said switches for causing energization of the heater on closure of the first named heater control switch by the timing means in case of the presence of more than a predetermined quantity of cold water in the tank at that time, for causing a delay of an adjustably predetermined length of time in the energization of the heater in case of the presence of less than said predetermined quantity of cold water in the tank at the start of an off-peak period, for causing energization of the heater during said delay time in case withdrawal of hot water from the tank causes the tank to contain more than said predetermined quantity of cold water, for causing continuation of the energization of the heater beyond the end of the off-peak period in case the tank contains more than said predetermined quantity of cold water at the end of the off-peak period and for causing deenergization of the heater as soon as substantially all of the water in the tank has been heated to a given temperature.

10. An off-peak water heating system for a hot water tank comprising an electric heater and means including a plurality of time controlled switches and a plurality of switches controlled by tank water temperature and by the time controlled switches for selectively causing immediate and delayed energization of the heater relative to the start of an off-peak period in accordance with the quantity of hot water in the tank at that time and for selectively causing immediate deenergization of the heater at the end of an off-peak period and delayed deenergization beyond the end of an off-peak period in accordance with the quantity of hot water in the tank at the end of an off-peak period.

CLARK M. OSTERHELD.